United States Patent [19]

Kawazoe

[11] Patent Number: 5,786,962
[45] Date of Patent: Jul. 28, 1998

[54] MAGNETIC HEAD ASSEMBLY

[75] Inventor: Kazushige Kawazoe, Kanagawa, Japan

[73] Assignee: Sony Corporation, Tokyo, Japan

[21] Appl. No.: 785,966

[22] Filed: Jan. 22, 1997

[30]     Foreign Application Priority Data

Jan. 24, 1996  [JP]  Japan .................................... 8-029849
[51] Int. Cl.$^6$ ............................... G11B 5/60; G11B 21/21
[52] U.S. Cl. ............................................. 360/104; 360/103
[58] Field of Search .................................. 360/104, 103; 29/603.04, 603.07

[56]     References Cited

U.S. PATENT DOCUMENTS 5,519,552  5/1996  Kohira et al. .......................... 360/104

*Primary Examiner*—Robert S. Tupper
*Attorney, Agent, or Firm*—Hill & Simpson

[57]     ABSTRACT

In a magnetic head assembly in which a slider mounted with a magnetic head is fitted to a gimbal portion where lead wires are provided, the thickness of a gimbal portion where terminals of the lead wires are formed is formed thinner than another gimbal portion, and the terminals of the lead wires formed on this thin gimbal portion 1a are transformed so as to come into contact with terminals of the magnetic head. It is thus possible to connect terminals of thin film lead wires formed on a gimbal to terminals of a magnetic head mounted on a slider easily and surely.

7 Claims, 11 Drawing Sheets

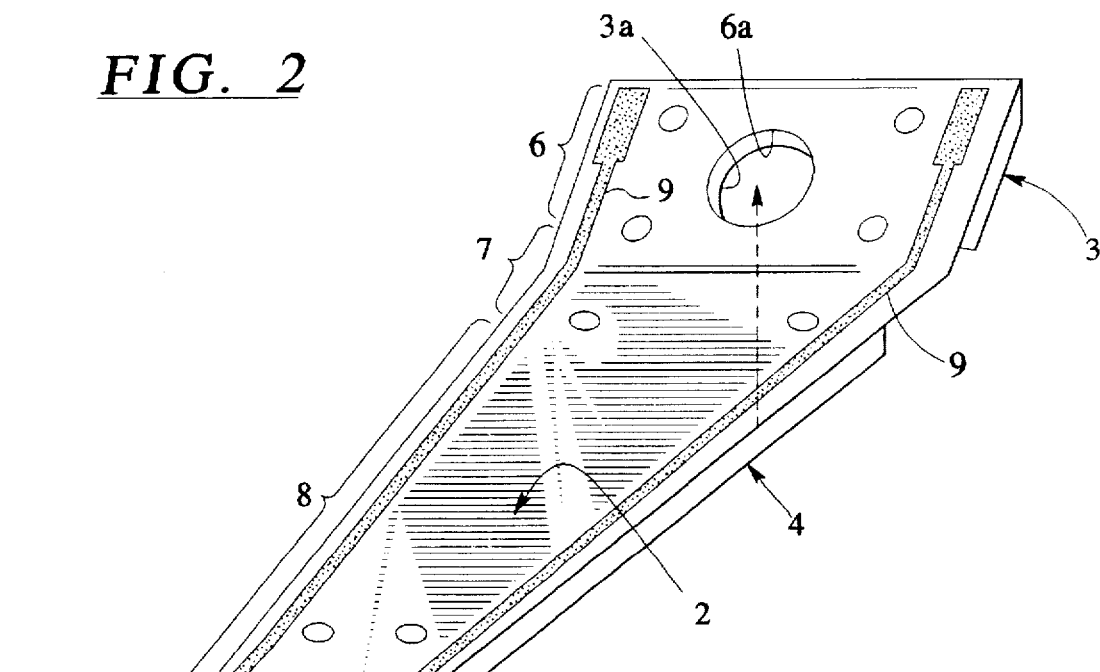
FIG. 2
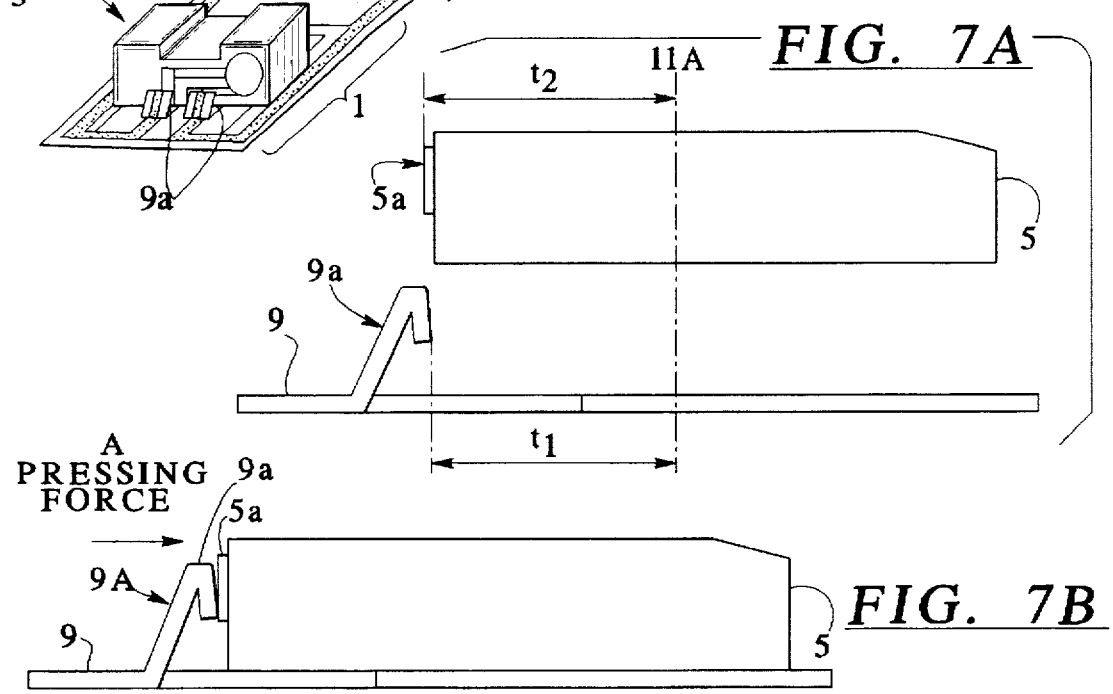
FIG. 7A
FIG. 7B
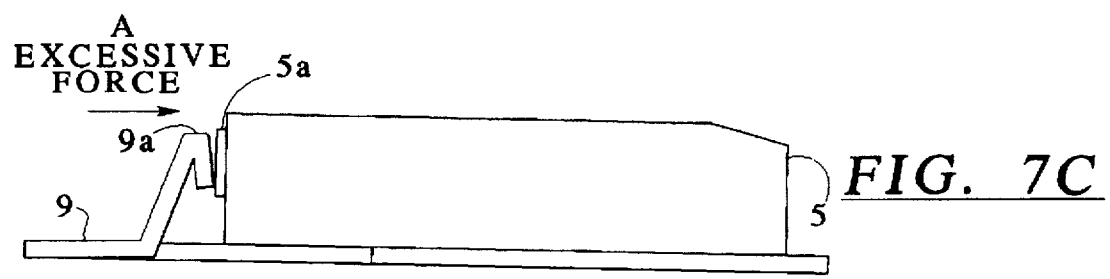
FIG. 7C

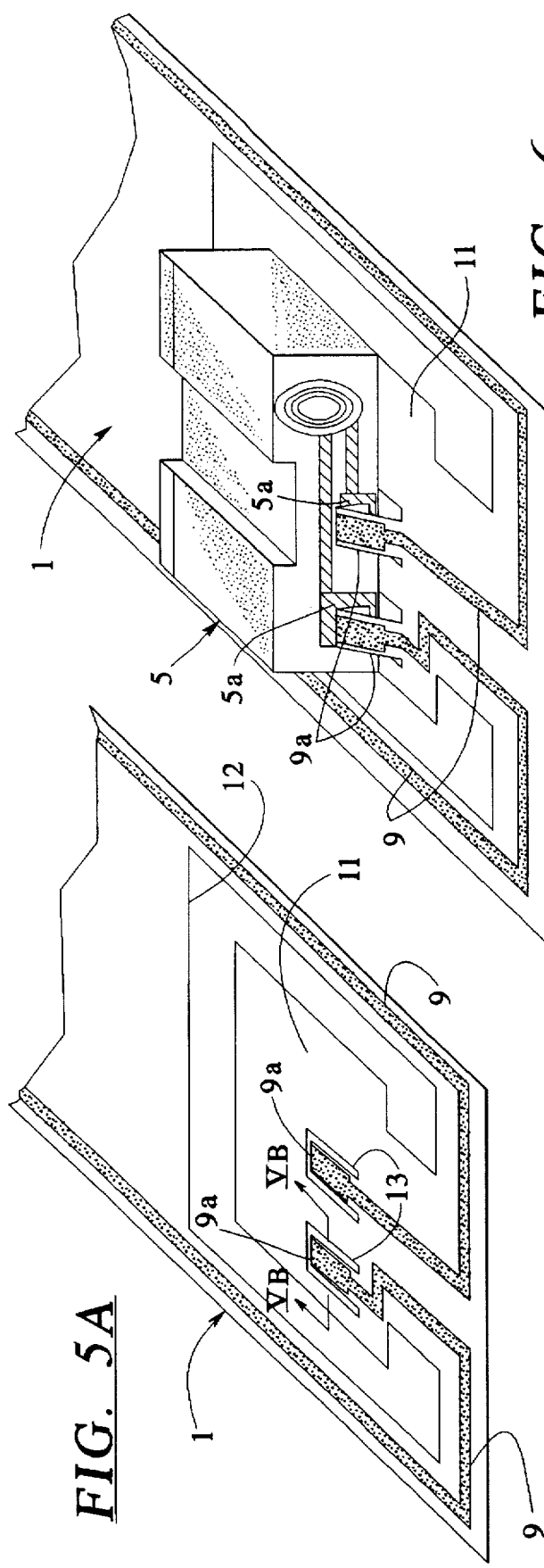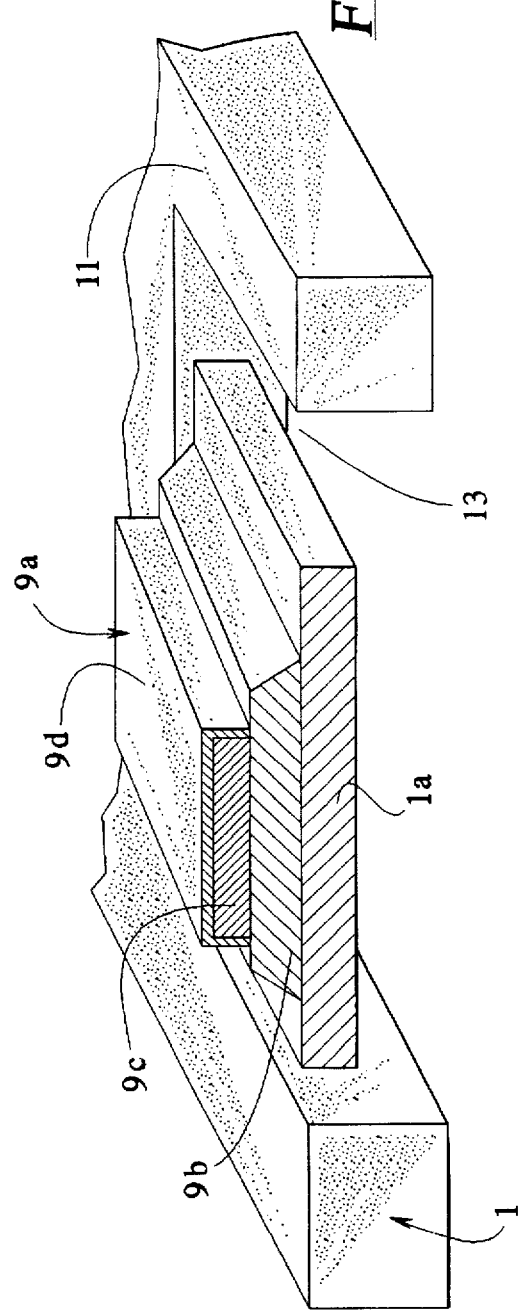

IN THE CASE OF TWO TERMINALS

IN THE CASE OF FOUR TERMINALS

MAGNETIC HEAD ASSEMBLY

BACKGROUND OF THE INVENTION

1. Field of the Invention

The present invention relates to a magnetic head assembly suitable for a hard disk unit or the like in which a slider on board with a magnetic head is mounted to a gimbal portion where lead wires have been provided, and the terminals of the lead wires and the terminals of the magnetic head are connected with each other.

2. Description of Related Art

A magnetic head assembly used in a magnetic recorder such as a hard disk unit is provided with a base plate 101, a load beam 102 mounted on the base plate 101, a gimbal 103 mounted on the point portion of the load beam 102 and a slider 104 on which a magnetic head 106 mounted on the gimbal 103 is mounted as shown in FIG. 19.

The above-mentioned load beam 102 functions as a suspension for pressing the slider 104 against a recording medium at time of recording and reproduction, and is composed of an arm mounting portion 102a to which the base plate 101 is mounted, an elastic portion 102b being bent at a predetermined angle and functioning as an elastic body, a rigid body portion 102c provided with rigidity by being bent on both sides, and a gimbal mounting portion 102d where the gimbal 103 is mounted. Further, when this magnetic head assembly is incorporated in the magnetic recorder, the arm mounting portion 102a where the base plate 101 is mounted is fitted to an arm for moving the magnetic head assembly.

The gimbal 103 mounted at the point portion of this load beam 102, i.e., the gimbal mounting portion 102d is for making not to disturb the movement of the slider 104, and an opening portion 103a is provided around the mounting portion of the slider 104 so that the slider 104 may move in a pitch direction and in a roll direction. Further, the slider 104 becomes movable in the pitch direction and in the roll direction by means of the gimbal 103 having such opening portion 103a, and the slider 104 is held at a fixed floating quantity on the recording medium at time of recording and reproduction irrespective of the situation such as the surface property of the recording medium.

A magnetic head 106 composed of a magnetic core, a coil or the like is formed on the slider 104 mounted to such gimbal 103. Further, when recording and reproduction are performed, with this magnetic head 106, the magnetic head 106 floats on the recording medium together with the slider 104, and performs recording and reproduction for the recording medium in the floating state.

Lead wires 105 are derived from the terminals 104a of the magnetic head 106, and these lead wires 105 are led to the arm along the gimbal 103 and the load beam 102 and connected to an external circuit.

In such a magnetic head assembly, as miniaturization and mass storage formation of a magnetic recorder are advanced, miniaturization of the slider 104 is advanced, and the floating quantity at time of recording and reproduction becomes smaller. To be concrete, the dimensions of the slider 104 become 2.0 mm or less in length, 1.6 mm or less in width and 0.43 mm or less in height, and the floating quantity thereof at time of recording and reproduction has become 0.1 μm or less.

Further, the magnetic head 106 that adopts an MR head for reproduction is increasing. Since it is required also to mount an inductive head for recording on the slider 104 when the MR head is adopted, the number of lead wires 105 for connecting the terminal 104a of the magnetic head 106 to an external circuit is doubled as compared with that in the past.

When the slider 104 becomes smaller in size and reduction in the floating quantity advances, the influence by the rigidity of the lead wires 105 connected to the terminals 104a of the magnetic head 106 on the movement of the slider 104 becomes greater. Namely, the movement of the slider 104 becomes unstable because of the influence by the rigidity of the lead wires 105, and, for example, a change is produced in the floating quantity of the slider 104, and normal recording and reproduction become no longer able to be performed.

Now, in order to solve such a problem, a method of forming thin film lead wires on the gimbal 103 has been developed. Namely, the lead wires 105 are not connected to the terminals 104a of the magnetic head 106, but thin film lead wires are formed on the gimbal 103 in advance, and the terminals of these thin film lead wires and the terminals 104a of the magnetic head 106 are connected with each other. By doing so, it is possible to reduce the influence by the lead wires on the movement of the slider 104 by a large margin.

There are some devices in which the terminals of the thin film lead wires and the terminals of the magnetic head are connected with each other using a thin film lead wires as described above. For example, as shown in FIG. 20, thin film lead wires 111 are formed on a gimbal 110 in advance, Au balls 115 are arranged between terminals 112 of the thin film lead wires 111 and terminals 114 of the magnetic head 113 using an Au ball bonder apparatus, and the terminals 112 of the thin film lead wires 111 and the terminals 114 of the magnetic head 113 are connected with each other by means of these Au balls 115.

When the terminals 112 of the thin film lead wires 111 and the terminals 114 of the magnetic head 113 are connected with each other using the Au balls 115 as described above, however, when miniaturization of the magnetic head 113 proceeds, the positions of the Au balls 115, the positions of the terminals 112 of the thin film lead wires 111 and the positions of the terminals 114 of the magnetic head 113 have to be determined with very high precision, and it becomes difficult to connect the terminals 112 of the thin film lead wires 111 and the terminals 114 of the magnetic head 113 to each other securely. Furthermore, when miniaturization of the magnetic head 113 proceeds, the terminals 112 of the thin film lead wires 111 and the terminals 114 of the magnetic head 113 also become minute. Accordingly, the diameter of the Au ball 115 has also to be made smaller, thus making it difficult to connect the terminals 112 of the thin film lead wires 111 and the terminals 114 of the magnetic head 113 to each other securely.

When the thin film lead wires 111 are used as described above, it is difficult to connect the terminals 112 of the thin film lead wires 111 to the terminals 114 of the magnetic head 113 securely, and it has become a serious subject to make it possible to connect the terminals 112 of the thin film lead wires 111 and the terminals 114 of the magnetic head 113 to each other easily and securely.

Further, although it is possible to reduce the influence by rigidity of the lead wires on the movement of the slider by a large margin when the thin film lead wires are used as described above, the influence by rigidity of the thin film lead wires becomes no longer disregardable when the slider is miniaturized further. Namely, since a conventional thin film lead wire has a structure that, as shown in FIG. 21, Cu patterns 122 are formed on an insulating layer 121 formed on a gimbal 120, and a protective film 123 composed of polyimide or the like is formed further on these Cu patterns 122, it has comparatively high rigidity. Accordingly, as miniaturization of the slider advances further, the influence by rigidity of the thin film lead wires on the movement of the slider becomes no longer disregardable, and some rigidity reducing means has become necessary also for the thin film lead wires.

SUMMARY OF THE INVENTION

The present invention has been made in order to solve the above-mentioned subjects, and has for its object to provide a magnetic head assembly capable of connecting terminals of lead wires and terminals of a magnetic head to each other easily and securely, and also to reduce the rigidity of the lead wires of such a magnetic head assembly.

According to the present invention, the above-mentioned object may be achieved by means of a magnetic head assembly having a structure that a slider on board with a magnetic head at a gimbal portion where lead wires are provided is mounted, and the terminals of the lead wires and the terminals of the magnetic head are connected to each other, wherein the thickness of the gimbal portion at the portion where the terminals of the lead wires have been formed is formed thinner than other gimbal portions, and the terminals of the lead wires formed at this thin gimbal portion are transformed so as to make contact with the terminals of the magnetic head.

Further, the above-mentioned object may be achieved by a magnetic head assembly having a structure that a slider on board with a magnetic head is mounted on a gimbal portion where lead wires are provided, and the terminals of the lead wires and the terminals of the magnetic head are connected to each other, wherein no gimbal portion has been formed at the gimbal portion corresponding to the portion where the terminals of the lead wires have been formed and the terminals of the lead wires corresponding to the portions where no gimbal portion is formed are transformed so as to make contact with the terminals of the magnetic head.

In this magnetic head assembly, the terminals of the lead wires and the terminals of the magnetic head are connected directly to each other without using Au balls or the like. Accordingly, in this magnetic head assembly, it is possible to connect the terminals of the lead wires and the terminals of the magnetic head accurately to each other without causing problems such as positional slippage of Au balls only by having the terminals of the lead wires correspond to the terminals of the magnetic head in advance on the gimbal and transforming the portion where the terminals of the lead wires have been formed.

Further, either the thickness of the gimbal at the portion where the terminals of the lead wires are formed is formed thinner than that of other gimbal portions or no gimbal portion corresponding thereto is provided. Therefore, it is possible to lower the rigidity of the terminals of the transformed lead wires below the flexural rigidity of the other gimbal portions. Accordingly, even when the material thickness of the gimbal, the number of terminals of the magnetic head or the like are changed, it is possible to change the rigidity of the terminals of the lead wires and to adjust the pressing force against the slider to a desired value.

BRIEF DESCRIPTION OF THE DRAWINGS

FIG. 2 is a perspective view showing a structural example of a magnetic head assembly applied with the present invention.

FIG. 5A is a perspective view showing the vicinity of a gimbal portion of a magnetic head assembly while enlarging the same, and FIG. 5B is a perspective view taken along a section B—B showing a structure of a terminal portion of the thin film lead wire while enlarging the same.

FIG. 6 is a perspective view showing while enlarging the vicinity of a gimbal portion of the magnetic head assembly shown in FIG. 2.

FIG. 7A is a side view showing a positional relationship between a terminal of the thin film lead wire and a terminal of the magnetic head, FIG. 7B is a side view showing a state that a slider is mounted on a slider mounting portion, and FIG. 7C is a side view showing a state that the slider pressing force is excessive.

DETAILED DESCRIPTION OF THE PREFERRED EMBODIMENTS

A preferred embodiment of the present invention will be described in detail hereinafter with reference to the accompanying drawings.

Besides, since the embodiments described hereinafter are preferred examples of the present invention, technically desirable various limitations are set. Within the scope of the present invention, however, the present invention is not limited to these embodiments unless it is specified in particular in the description hereinafter to limit the present invention.

Figure 1:
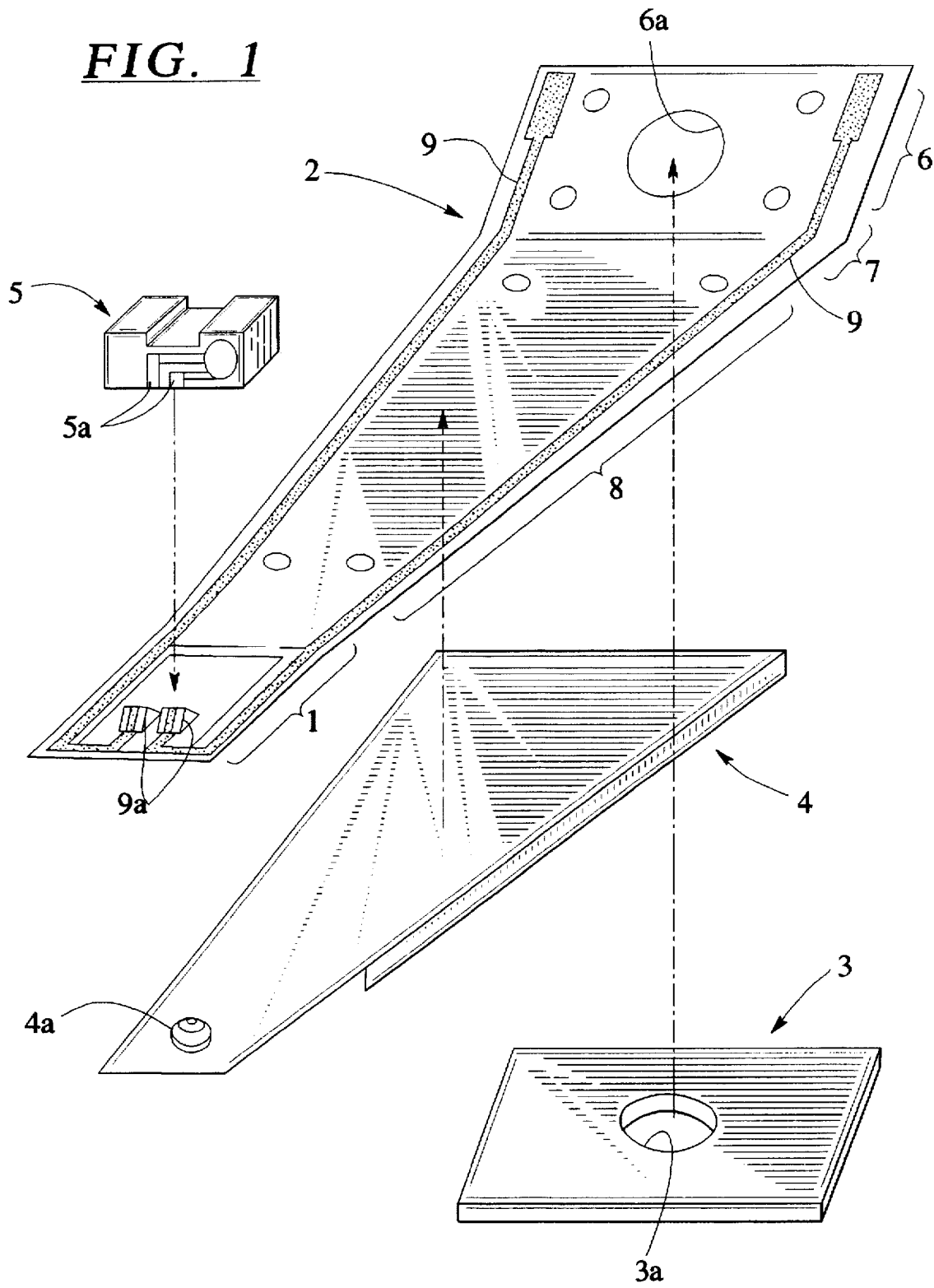
FIG. 1 is an exploded perspective view showing a structural example of a magnetic head assembly applied with the present invention.

A magnetic head assembly according to the present embodiment is provided with, as shown in FIG. 1, a load beam 2 with a gimbal portion 1 functioning as a gimbal formed at a point portion, a base plate 3 mounted to the rear end portion of the load beam 2, a reinforcing plate 4 mounted on the back of the load beam 2 for reinforcing the strength of the load beam 2, and a slider 5 on board with a magnetic head mounted on the gimbal portion 1 of the load beam 2, and the magnetic head assembly is structured by combining these components as shown in FIG. 2.

The above-mentioned load beam 2 is provided with an arm mounting portion 6 on which the base plate 3 is mounted, an elastic portion 7 bent at a predetermined angle, a rigid body portion 8 with the reinforcing plate mounted on the back, and a gimbal portion 1 functioning as a gimbal, and, for example, thin film lead wires 9 that are a pair of lead wires extending from the gimbal portion 1 over to the arm mounting portion 6 are formed. Here, the thin film lead wires 9 are formed in such a manner that a Cu pattern in a predetermined form is formed on, for example, a dielectric layer which is a dielectric portion formed on the load beam 2, and a conductive protective film is formed further so as to cover this Cu pattern.

Then, in the arm mounting portion 6, a base plate 3 is mounted so that the position of an opening portion 6a formed at the center of the arm mounting portion 6 and the position of an opening portion 3a formed at the center of the base plate 3 agree with each other. Here, the opening portions 3a and 6a are used for mounting the magnetic head assembly to the arm of the magnetic recorder when the magnetic head assembly is assembled in the magnetic recorder.

An elastic portion 7 which extends from the arm mounting portion 6 on which the base plate 3 is mounted as described above and is bent at a predetermined angle has elasticity, and functions as a suspension for pressing the slider 5 against the recording medium at time of recording and reproduction. On the other hand, the rigid body portion 8 located between the elastic portion 7 and the gimbal portion 1 is mounted on the back thereof with a reinforcing plate 4 for reinforcing the strength, and supports the slider 5 mounted on the gimbal portion 1 at the point of the load beam 2. Here, a projection 4a is formed at a point portion of the reinforcing plate 4, and the reinforcing plate 4 is mounted on the load beam 2 so as to push the slider 5 from the back of the gimbal portion 1 at this projected portion 4a.

The gimbal portion 1 formed at the point of the load beam 2 functions as a gimbal for not to disturb the movement of the slider 5 in the pitch direction and the roll direction at time of recording and reproduction. At the slider 5 mounted on the gimbal portion 1, a magnetic head consisting of a magnetic core, a coil or the like is formed, and a terminal 5a for recording and reproduction is exposed on the side of the slider 5. Further, terminals 9a of thin film lead wires 9 formed on the load beam 2 are connected to a terminal 5a of the magnetic head.

Next, the connection between the terminals 5a of the magnetic head and the terminals 9a of the thin film lead wires 9 will be described in more detail.

Figure 3:
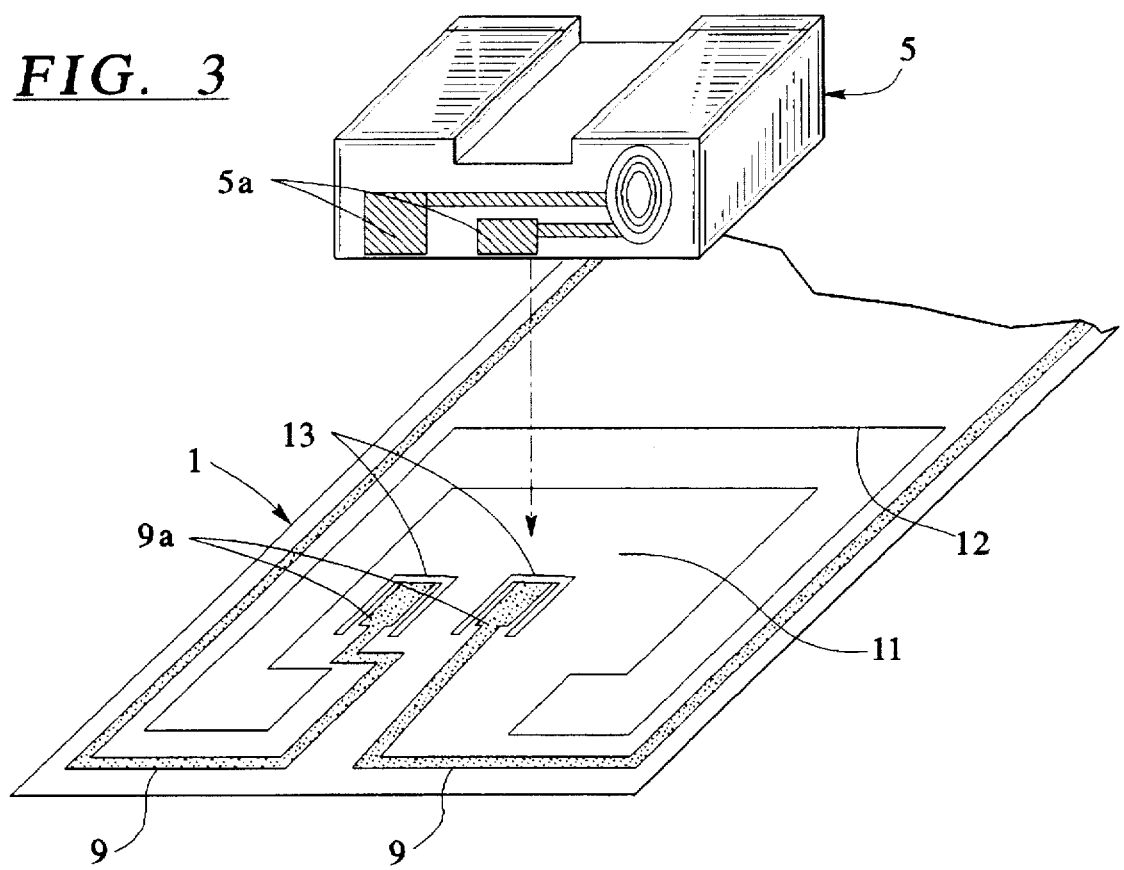
FIG. 3 is an enlarged exploded perspective view showing the state of mounting a slider on a gimbal portion of a magnetic head assembly.

FIG. 3 is an exploded perspective view in which the state of mounting the slider 5 to the gimbal portion 1 is magnified. As illustrated, an opening portion 12 is formed so as to leave a slider mounting portion 11 in the gimbal portion 1 formed at the point of the load beam 2. Namely, the opening portion 12 is formed around the slider mounting portion 11 where the slider 5 is mounted except the portion on the point side of the gimbal portion 1, so that the slider 5 mounted on the slider mounting portion 11 may be moved easily in the roll direction and the pitch direction.

Such a pair of thin film lead wires 9 formed on the gimbal portion 1 are formed so as to reach the slider mounting portion 11 through the portion on the point side of the gimbal portion 1 from the outside of the opening portion 12, respectively, so that the lead wires are not disconnected by the opening portion 12 formed at the gimbal portion 1, and the terminals 9a are formed on the slider mounting portion 11. Here, the positions of the terminals 9a of the thin film lead wires 9 are positioned at the positions corresponding to the terminals 5a of the magnetic head when the slider 5 has been mounted on the slider mounting portion 11. Further, small U-shaped opening portions 13 are formed around the terminals 9a of respective thin film lead wires 9 except the portion where the thin film lead wires have been formed, so that the portions where the terminals 9a of the thin film lead wires 9 have been formed in the slider mounting portion 11 may be transformed independently.

Figure 4A:
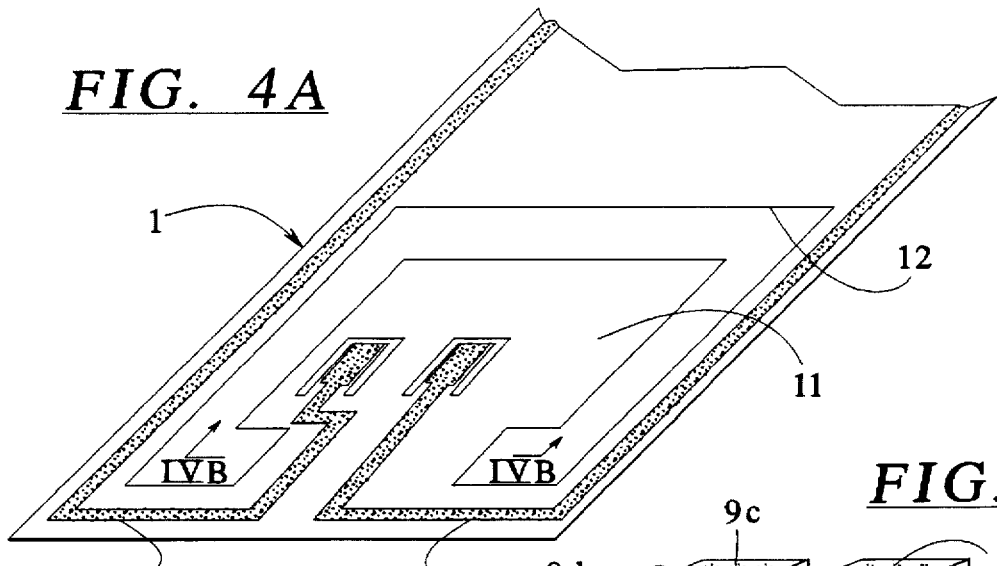
FIG. 4A is a perspective view showing the vicinity of a gimbal portion of a magnetic head assembly while enlarging the same.
Figure 4B:
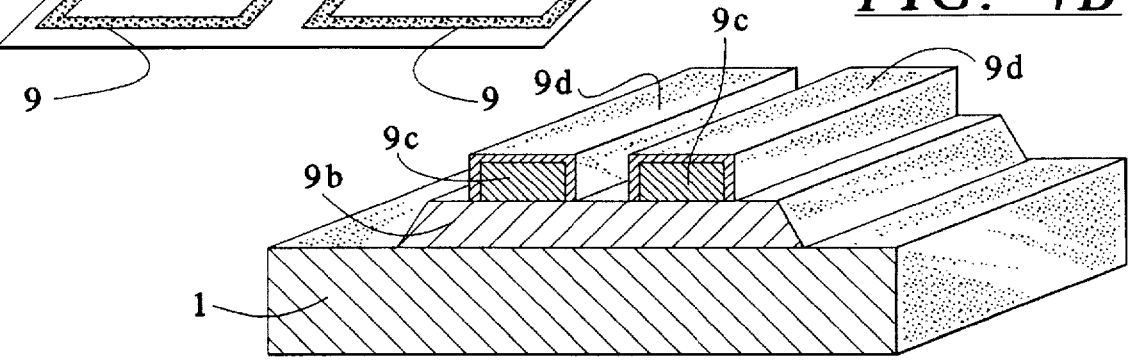
FIG. 4B is a perspective view taken along a section A—A showing a structure of a thin film lead wire while enlarging the same.

Here, the thin film lead wires 9 formed on the gimbal portion 1 are obtained by forming a Cu pattern covered with a protective film on a dielectric layer. Namely, as shown in FIGS. 4A and 4B, the thin film lead wires 9 are obtained by that a dielectric layer 9b composed of polyimide or the like is provided on the gimbal portion 1 composed of stainless steel or the like, conductor patterns 9c composed of Cu or the like are formed thereon, and furthermore, protective films 9d composed of Ni, Au or the like are formed so as to cover the conductor patterns 9c in order to prevent corrosion of the conductor patterns 9c.

Here, the dielectric layer 9b composed of polyimide or the like is formed by, for example, applying a polyimide material, and the conductor patterns 9c composed of Cu or the like and the protective films 9d composed of a conductor such as Ni and Au are formed by, for example, plating or vapor deposition. Further, these dielectric layer 9b, conductor patterns 9c and protective films 9d are applied with patterning by photolithography technique and formed into predetermined forms.

As described, by forming the protective film 9d of the conductor pattern 9c of a conductive material such as Ni and Au, it is possible to form the film thickness of the thin film lead wire 9 far thinner as compared with a conventional lead wire with polyimide or the like as a protective layer. Accordingly, the rigidity of this thin film lead wire 9 is very small. As a result, the influence by the thin film lead wires 9 upon the movement of the slider mounting portion 11 of the gimbal portion 1 in the pitch direction and the roll direction becomes very small. Thus, when thin film lead wires 9 with the protective films 9d formed of a conductor such as Ni and Au are used, the movement of the slider 5 becomes no longer disturbed by the influence of the thin film lead wires 9.

However, it is only the portion that exerts influence upon the movement of the slider mounting portion 11 in the pitch direction and the roll direction that the rigidity of the thin film lead wires 9 becomes an issue. Therefore, it may be limited only to the portion of the gimbal portion 1 that the protective films 9d are formed of a conductor such as Ni and Au, and the protective film may be formed of polyimide or the like similarly to conventional thin film lead wires concerning the thin film lead wires 9 formed in the other portions, for example, the thin film lead wires 9 formed at an arm mounting portion 6, an elastic portion 7 and a rigid body portion 8 of the load beam 2.

Further, as shown in FIGS. 5A and 5B, the thickness of the gimbal portion of a portion 1a where the terminal 9a of the thin film lead wire 9 is formed is formed thinner than the thickness of other gimbal portions 1. Namely, by applying half-etching processing to a gimbal portion 1a located under the terminal 9a of the thin film lead wire 9 surrounded by the above-mentioned U-shaped opening portion 13, the gimbal thickness of that portion 1a is formed thinner than the thickness of other gimbal portions 1, thus reducing the rigidity of the terminal 9a of the thin film lead wire 9.

To be concrete, masking is applied to the portion other than the gimbal portion 1a located right under the terminal 9a of the thin film lead wire 9, and chemical etching such as chemical polishing and electrolytic polishing or mechanical etching such as sand blasting is applied to the exposed gimbal portion 1a, thereby to form the thickness of the gimbal portion 1a located under the terminal 9a of the thin film lead wire 9 thinner than the thickness of other gimbal portions 1. Namely, the terminal 9a of the thin film lead wire 9 is formed in such a manner that a dielectric layer 9b composed of polyimide or the like is provided on the gimbal portion 1a having a wall thickness thinner than that of surrounding gimbal portion 1, a conductor pattern 9c composed of Cu or the like is formed thereon, and furthermore, protective films 9d composed of Ni, Au or the like are formed so as to cover the conductor patterns 9c.

The slider 5 which is mounted on the gimbal portion 1 thus formed is mounted on the slider mounting portion 11 so that the positions of the terminals 9a of the thin film lead wires 9 and the positions of the terminals 5a of the magnetic head correspond to each other. At this time, the portions where the terminals 9a of the thin film lead wires 9 of the slider mounting portion 11 are formed are bent toward the slider 5 side and also turned down in an angle form so that the terminals 9a of the thin film lead wires 9 come into contact with the terminals 5a of the magnetic head. Namely, since the terminals 9a of the thin film lead wires 9 formed at the gimbal portion 1a having a thin wall thickness are bent in an angle form, the terminals 9a of the thin film lead wires 9 and the terminals 5a of the magnetic head come into contact with each other, and these terminals 9a and terminals 5a are connected to each other electrically.

Here, as shown in FIG. 7A, the portion of the terminal 9a of the thin film lead wire 9 is arranged so that, when the portion of the terminal 9a of the thin film lead wire 9 is bent, the distance t1 from a center 11A of the slider mounting portion 11 to the terminal 9a of the thin film lead wire 9 becomes shorter than the distance t2 from the center 11A of the slider mounting portion 11 to the terminal 5a of the magnetic head. By means of the arrangement as described above, a portion 9A where the terminal 9a of the thin film lead wire 9 is formed acts like a leaf spring when the slider 5 is mounted on the slider mounting portion 11 as shown in FIG. 7B, and operates so as to press the terminal 9a of the thin film lead wire 9 against the terminal 5a of the magnetic head as shown with an arrow mark A in FIG. 7B, thus obtaining electrical conductivity between the terminal 9a of the thin film lead wire 9 and the terminal 5a of the magnetic head.

Besides, since the terminal 9a of the thin film lead wire 9 is being pressed against the terminal 5a of the magnetic head, it is not required to apply bonding or the like to the portion of the terminal 9a of the thin film lead wire 9, but a fixing method of ultrasonic bonding, soldering or the like may be used jointly in order to make surer of the connection between the terminal 9a of the thin film lead wire 9 and the terminal 5a of the magnetic head.

When the terminal 9a of the thin film lead wire 9 is fixed to the terminal 5a of the magnetic head by ultrasonic bonding, soldering or the like, the pressing force against the terminal 5a of the magnetic head is scarcely required. Therefore, in such a case, the gimbal portion 1a corresponding to the portion where the terminal 9a of the thin film lead wire 9 is formed may be all removed. That is to say, by applying etching processing to the gimbal portion 1 located under the terminal 9a of the thin film lead wire 9 surrounded by the above-mentioned U-shaped opening portion 13, the gimbal portion 1a is removed.

To be concrete, masking is applied to a portion other than gimbal portions 1a located right under the terminals 9a of the thin film lead wires 9, and chemical etching such as chemical polishing and electrolytic polishing or mechanical etching such as sand blasting is applied to the exposed gimbal portions 1a, thereby to remove all of the gimbal portions 1a located under the terminals 9a of the thin film lead wires 9. In this case, the terminal 9a of the thin film lead wire 9 is formed of a dielectric layer 9b composed of polyimide etc., a conductor pattern 9c composed of Cu or the like formed thereon and a protective film 9d composed of Ni, Au or the like formed so as to cover the conductor pattern 9c, and no gimbal portion that becomes a substrate does not exist. Namely, when the terminal 9a of the thin film lead wire 9 is fixed to the terminal 5a of the magnetic head by ultrasonic bonding, soldering and so on, it is indifferent to obtain a pressing force against the terminal 5a of the magnetic head only by the rigidity of the dielectric layer 9b, the conductor pattern 9c and the protective film 9d.

Figure 8A:
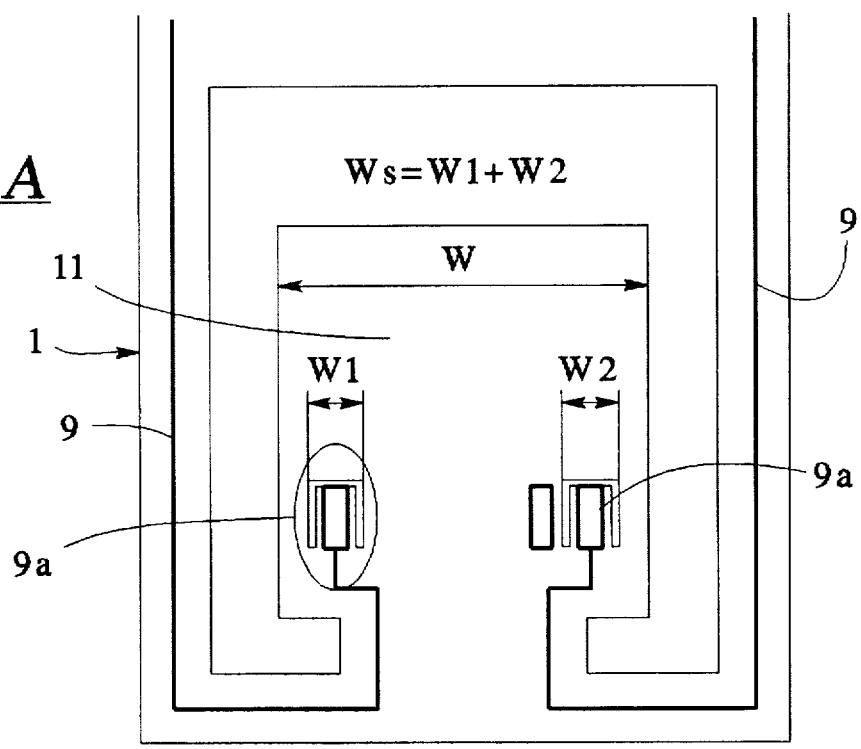
FIG. 8A is a plan view showing the relationship between the total width W of the slider mounting portion and the terminal width Ws when the thin film lead wire has two terminals.

In the embodiment of the present invention, it is because of the following reasons that the wall thickness of the gimbal portion 1a located under the terminal 9a of the thin film lead wire 9 is formed thin or the gimbal portion 1a is removed entirely. Namely, rigidity is produced due to a fact that the terminal 9a of the thin film lead wire 9 is bent in an angle shape, but the rigidity of the whole terminal is changed depending on the thickness of the material of the gimbal portion 1, the number of terminals of the magnetic head and so on. For example, when the terminals 5a of the magnetic head are two terminals, the width Ws (=W1+W2) occupied by the terminals 9a of the thin film lead wires 9 on the whole width W of the slider mounting portion 11 is small as shown in FIG. 8A and the flexural rigidity of the slider mounting portion 11 is higher. Thus, the change of rigidity of the terminals 9a of the thin film lead wires 9 offers no significant problem.

Figure 8B:
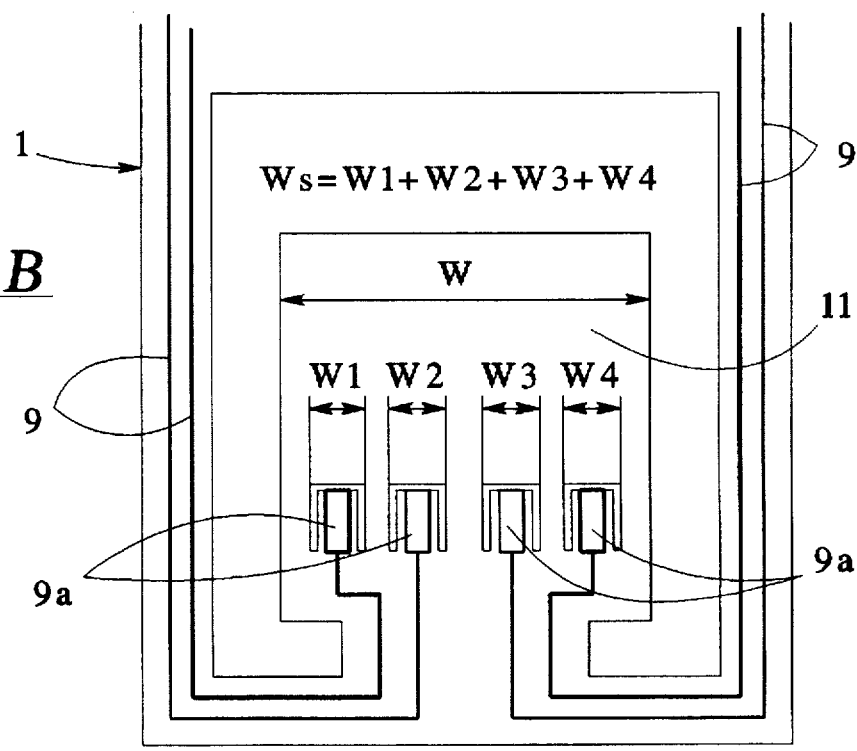
FIG. 8B is a plan view showing the relationship between the total width W of the slider mounting portion and the terminal width Ws when the thin film lead wire has four terminals.

When the terminals 5a of the magnetic head are four terminals for instance, however, as shown in FIG. 8B, the width Ws (=W1+W2+W3+W4) occupied by the terminals 9a of the thin film lead wires 9 on the whole width W of the slider mounting portion 11 becomes larger, thus making it impossible to disregard the rigidity of the terminals 9a of the thin film lead wires 9. The same is also applied when miniaturization of the slider 5 is advanced and the width Ws occupied by the terminals 9a of the thin film lead wires 9 becomes larger. In extreme cases, the rigidity of the terminals 9a of the bent thin film lead wires 9 becomes higher than the flexural rigidity of the slider mounting portion 11, thus generating possibility that a pressing force A against the slider becomes excessive thereby to produce transformation in the gimbal portion 1 as shown in FIG. 7C, thus exerting an influence upon the floating posture of the slider 5 in the pitch direction and the roll direction.

Thus, as a magnetic head assembly according to the embodiment of the present invention, when the wall thickness of the gimbal portions 1a located under the terminals 9a of the thin film lead wires 9 is formed thin or the whole thereof is removed, it is possible to change the whole rigidity of the terminals 9a by regulating an etching quantity even when the thickness of the material of the gimbal portion 1, the number of terminals of the magnetic head and so on are changed. Therefore, it is possible to set the pressing force against the terminals 5a of the magnetic head at a desired value.

Figure 9A:
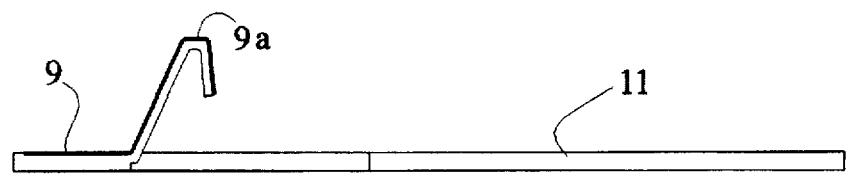
FIG. 9A is a side view showing a state wherein the portion of the terminal of the thin film lead wire is bent.
Figure 9B:
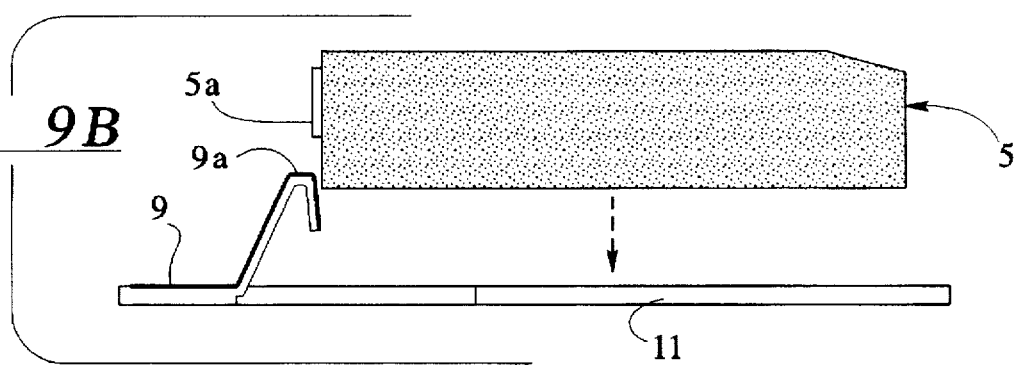
FIG. 9B is a side view showing a state of mounting a slider on a slider mounting portion.

As described above, when the slider 5 is mounted on the slider mounting portion 11, for example, the portion where the terminal 9a of the thin film lead wire 9 is formed is bent in advance toward the side of the slider 5 and folded back in an angle shape at the same time as shown in FIG. 9A, and the slider 5 is mounted at a predetermined position of the slider mounting portion 11 thereafter as shown in FIG. 9B.

Figure 9C:
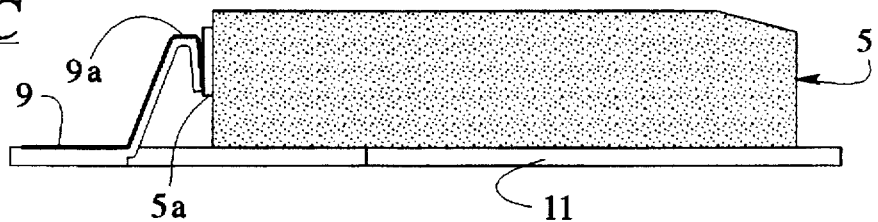
FIG. 9C is a side view showing a state that a slider has been mounted on the slider mounting portion.

With this, as shown in FIG. 9C, the terminal 9a of the thin film lead wire 9 is pressed against the terminal 5a of the magnetic head, and the terminal 9a of the thin film lead wire 9 and the terminal 5a of the magnetic head are connected electrically to each other, and the slider 5 is mounted at the slider mounting portion 11 thereafter.

Figure 9D:
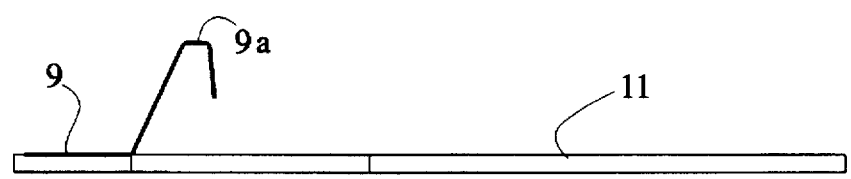
FIG. 9D is a side view showing an embodiment wherein a gimbal portion-free terminal of the thin film lead wire is bent.
Figure 9E:
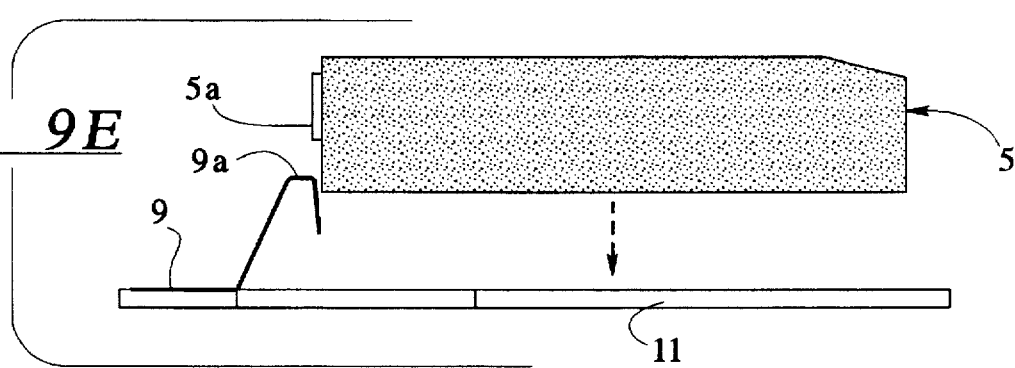
FIG. 9E is another side view showing a state of mounting on a slider on a slider mounting portion in the embodiment of FIG. 9D.
Figure 9F:
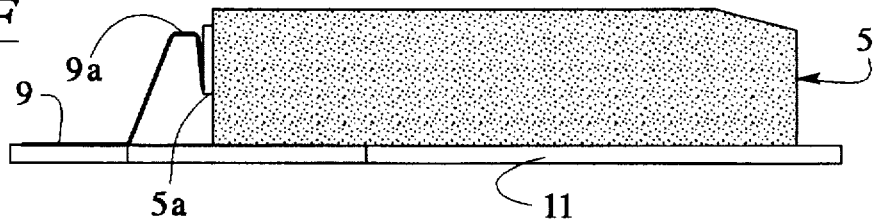
FIG. 9F is another side view showing a state that a slider has been mounted on the slider mounting portion in the embodiment of FIG. 9D.

FIGS. 9D-9F illustrate a situation resulting when the gimbal portion of the terminal 9a has been completely removed rather than merely thinned, as described above.

Figure 10A:
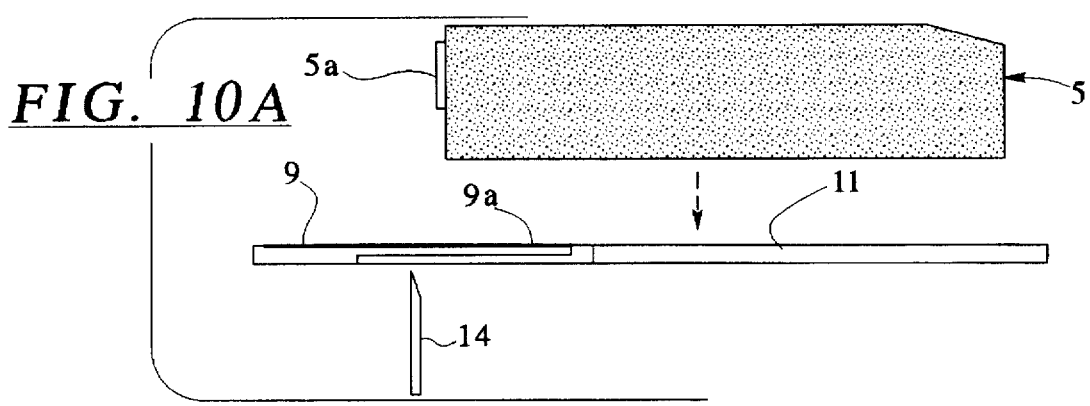
FIG. 10A is a side view showing the situation of mounting a slider on a slider mounting portion.
Figure 10B:
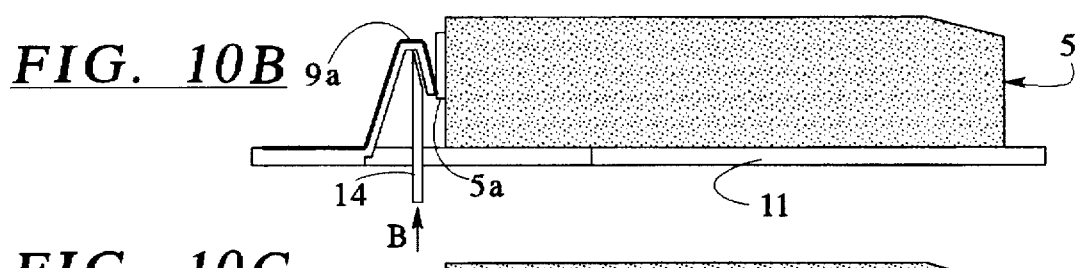
FIG. 10B is a side view showing the situation of bending a portion of a terminal of the thin film lead wire with a knife edge.
Figure 10C:
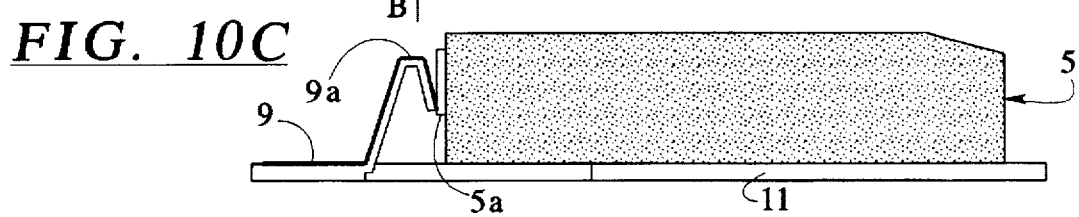
FIG. 10C is a side view showing a state that a slider has been mounted on the slider mounting portion.

Or, for example, as shown in FIG. 10A, the slider 5 is mounted at a predetermined position of the slider mounting portion 11, and, as shown in FIG. 10B, the portion where the terminal 9a of the thin film lead wire 9 has been formed is pushed upward from the bottom thereafter as shown with an arrow mark B in FIG. 10B with a knife-edge 14 or the like. With this, as shown in FIG. 10C, a state that the portion of the terminal 9a of the thin film lead wire 9 is folded back in an angle shape and the terminal 9a of the thin film lead wire 9 is pressed against the terminal 5a of the magnetic head is presented. As a result, the terminal 9a of the thin film lead wire 9 and the terminal 5a of the magnetic head are connected electrically to each other, and the slider 5 is mounted on the slider mounting portion 11 thereafter.

As described above, in a magnetic head assembly according to the present embodiment, it is possible to mount the slider 5 at the slider mounting portion 11 and to connect the terminal 5a of the magnetic head to the terminal 9a of the thin film lead wire 9 at the same time. Moreover, in this magnetic head assembly, the terminal 5a of the magnetic head and the terminal 9a of the thin film lead wire 9 are connected only by bending the portion of the terminal 9a of the thin film lead wire 9. Therefore, it is possible to connect the terminal 5a of the magnetic head to the terminal 9a of the thin film lead wire 9 much more easily as compared with a case that the terminal 5a of the magnetic head and the terminal 9a of the thin film lead wire 9 are connected with each other by means of Au balls and so on.

Besides, it is sufficient that the portion of the terminal 9a of the thin film lead wire 9 is bent so that the terminal 9a of the thin film lead wire 9 and the terminal 5a of the magnetic head come into contact with each other, and bending is not limited to a shape that the portion is folded back in an angle shape as described above.

Figure 10D:
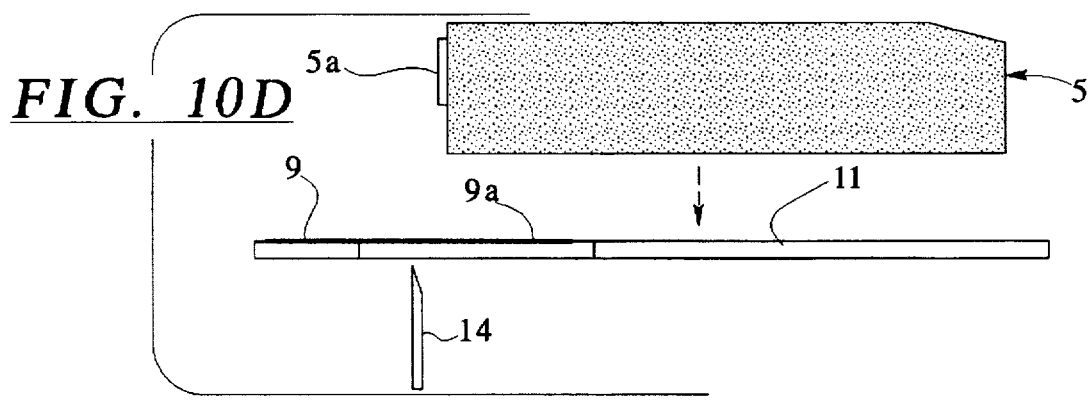
FIG. 10D is a side view showing the situation of mounting a slider on a slider mounting portion in an embodiment where the terminal of the thin film lead wire is gimbal portion-free.
Figure 10E:
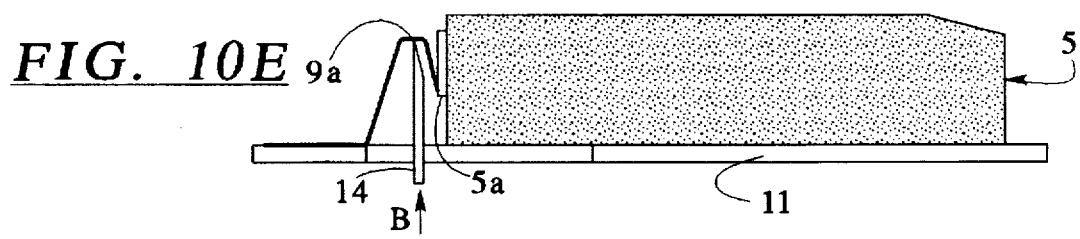
FIG. 10E is a side view showing the situation of bending a portion of a terminal of the thin film lead wire with a knife edge.
Figure 10F:
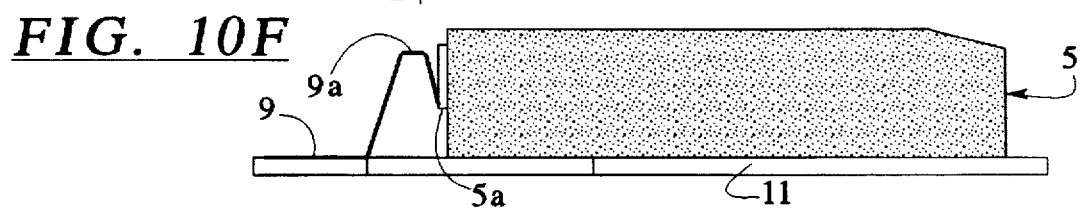
FIG. 10F is a side view showing a state that a slider has been mounted on the slider mounting portion.

FIGS. 10D-10F illustrate a situation resulting when the gimbal portion of the terminal 9a has been completely removed rather than merely thinned, as described above.

Figure 11:
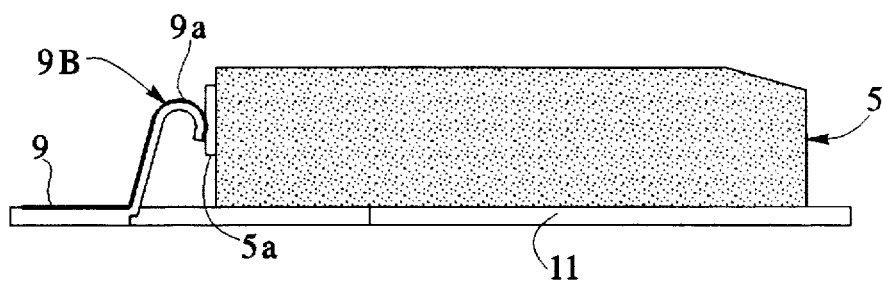
FIG. 11 is a side view showing an example of how to connect a terminal of the thin film lead wire to a terminal of the magnetic head.

To be concrete, for example, as shown in FIG. 11, the portion where the terminal 9a of the thin film lead wire 9 has been formed is bent toward the side of the slider 5 and may be formed into a shape to roll in the portion by providing curvature R at the portion 9B of the point thereof.

Figure 11A:
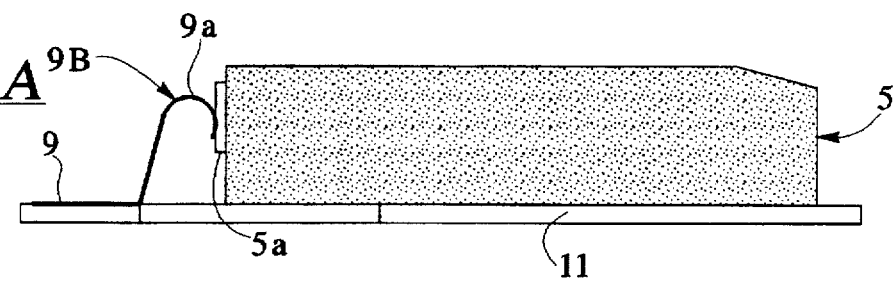
FIG. 11A is a side view showing an example of how to connect a terminal of the thin film lead wire to a terminal of the magnetic head when all of the gimbal portion supporting the terminal has been removed.

FIG. 11A illustrates a situation resulting when the gimbal portion of the terminal 9a has been completely removed rather than merely thinned, as described above.

Figure 12:
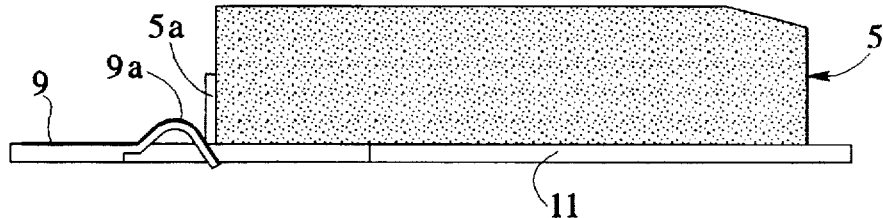
FIG. 12 is a side view showing another example of how to connect a terminal of the thin film lead wire to a terminal of the magnetic head.

Or, for example, as shown in FIG. 12, it may also be arranged so that the portion of the terminal 5a of the magnetic head is formed in advance at a position where that portion is lowered to a mounting surface to the slider mounting portion 11, and the portion where the terminal 9a of the thin film lead wire 9 is bent slightly.

Figure 12A:
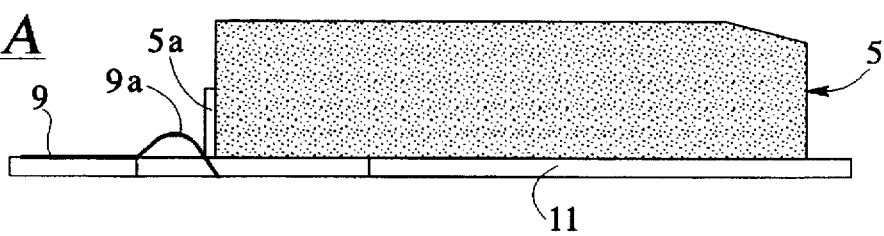
FIG. 12A is a side view showing another example of how to connect a terminal of the thin film lead wire to a terminal of the magnetic head when all of the gimbal portion supporting the terminal has been removed.

FIG. 12A illustrates a situation resulting when the gimbal portion of terminal 9a has been completely removed rather than merely thinned, as described above.

Figure 13:
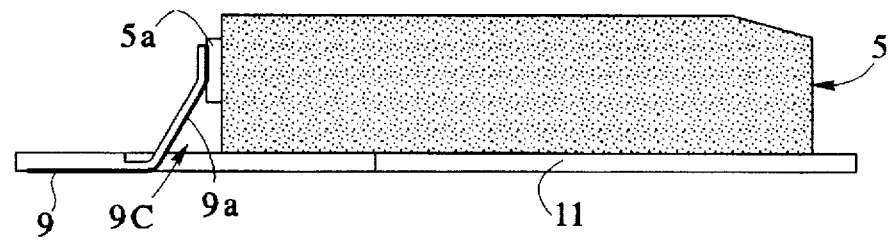
FIG. 13 is a side view showing still another example of how to connect a terminal of the thin film lead wire to a terminal of the magnetic head.

Or again, for example, as shown in FIG. 13, it may also be arranged so that the thin film lead wire 9 is formed in advance on the back side of the slider mounting portion 11, and this portion 9C is bent toward the slider 5 side. By doing so, the terminal 9a of the thin film lead wire 9 and the terminal 5a of the magnetic head are connected to each other only by bending the portion of the terminal 9a of the thin film lead wire 9 to one side without folding it back in an angle shape. In this case, the wall thickness of the gimbal portion 1a located on the top of the terminal 9a of the thin film lead wire 9, that is, on the surface side is formed thin, or the whole of the gimbal portion 1a is removed.

Figure 13A:
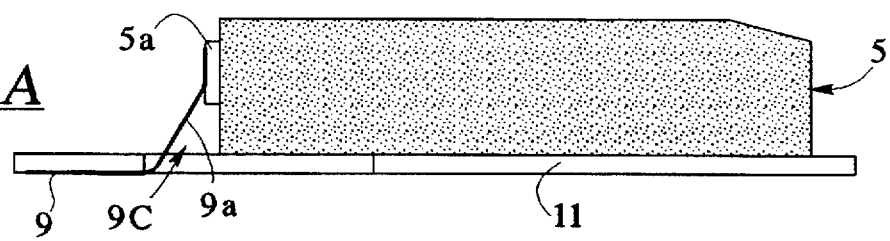
FIG. 13A is a side view showing still another example of how to connect a terminal of the thin film lead wire to a terminal of the magnetic head when all of the gimbal portion supporting the terminal has been removed.

FIG. 13A illustrates the situation resulting when the gimbal portion of the terminal 9a has been completely removed rather than merely thinned, as described above.

Besides, as to the configuration of an opening portion 13 formed around the terminal 9a of the thin film lead wire 9 thus bent and connected to the terminal 5a of the magnetic head, it is sufficient that the portion where the terminal 9a of the thin film lead wire 9 among the slider mounting portion 11 may be transformed independently.

Figure 14:
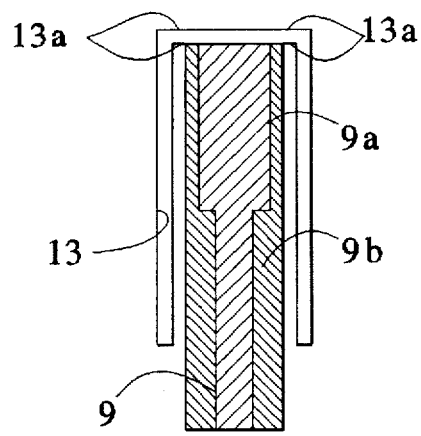
FIG. 14 is a plan view showing an example of a configuration of an opening portion formed around a terminal of the thin film lead wire.
Figure 15:
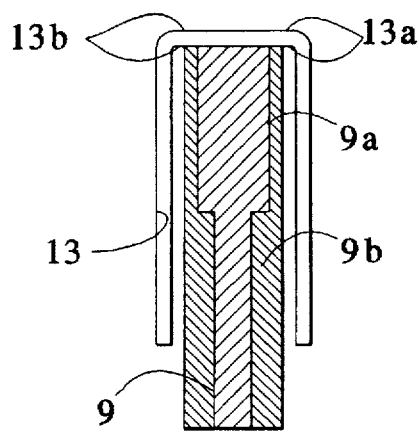
FIG. 15 is a plan view showing another example of a configuration of an opening portion formed around a terminal of the thin film lead wire.
Figure 16:
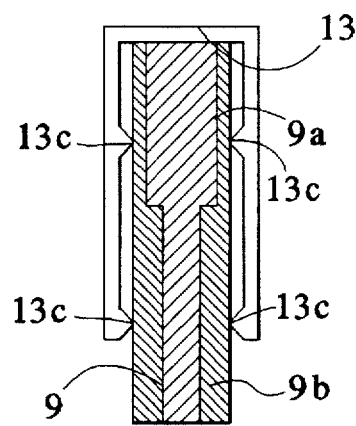
FIG. 16 is a plan view showing still another example of a configuration of an opening portion formed around a terminal of the thin film lead wire.

Concrete examples of the configuration of the opening portion 13 are shown in FIG. 14 to FIG. 16 with the vicinity of the portion of the terminal 9a of the thin film lead wire 9 enlarged.

Namely, for example, as shown in FIG. 14, the opening portion 13 is formed on three sides except the portion where the thin film lead wire 9 is derived among the circumference of the terminal 9a of the thin film lead wire 9 formed with the conductor pattern 9c covered with the protective film 9d formed on the dielectric layer 9b, and corners 13a of the opening portion 13 are formed to show right angles. Since the opening portion having such a configuration has the advantage that it can be formed easily because the configuration is comparatively simple.

Or again, for example, as shown in FIG. 15, an opening portion 13 is formed on three sides except a portion where the thin film lead wire 9 is derived among the circumference of the terminal 9a of the thin film lead wire 9 in which the conductor pattern 9c covered with the protective film 9d is formed on a dielectric layer 9b, and the portions of the corners 13b of the opening portion 13 are rounded at the same time. By forming the opening portion 13 in such a configuration, sharp edge portions will never be produced when this portion is bent. Therefore, by forming the opening portion 13 in such a rounded configuration as described above, the possibility of injuring the magnetic head and the slider 5 with the edge portion around the terminal 9a of the thin film pattern 9 is precluded when the slider 5 is mounted on the slider mounting portion 11.

Or, for example, as shown in FIG. 16, an opening portion 13 is formed on three sides except the portion where the thin film lead wire 9 is derived among the circumference of the terminal 9a of the thin film lead wire 9 in which the conductor pattern 9c covered with the protective film 9d is formed on the dielectric layer 9b, and notch portions 13c are provided at portions corresponding to the portions that are bent, viz., at the tail end portion of the opening portion 13 and both sides of the terminal 9a of the thin film lead wire 9 in order to facilitate bending. When notch portions 13c are provided as described above, it becomes possible, when the portion where the terminal 9a of the thin film lead wire 9 is formed is bent as shown in FIG. 9, FIG. 10 or FIGS. 11 to 13, to bend the portion at a predetermined position very easily and accurately by bending it along the notch portions 13c.

Besides, although it has been described that there are two terminals of the magnetic head and only two lines of thin film lead wires are derived, the number of terminals of the magnetic head is not limited thereto. To be concrete, for example, it may be arranged so that a magnetic head of a magnetoresistive effect type is mounted for reproduction and two terminals are derived from this magnetic head, and, apart from the above, a magnetic head of an inductive type for recording is mounted and two terminals are derived from this magnetic head, thus deriving four terminals in total. Further, even when the number of terminals of the magnetic head is three or more, it is sufficient to increase the number of the thin film lead wires and the terminals thereof, and the embodiment of the present invention is effective in particular when the number of the terminals of the magnetic head is large.

Moreover, when the number of the lead wires is increased as described above, the influence by the rigidity of the lead wires is liable to become greater, and it is required to connect the terminals of the magnetic head to the terminals of the thin film lead wires with higher precision. Accordingly, when the number of lead wires is increased as described above, an effect that the rigidity of the thin film lead wires and the terminals thereof is very low and the influence by the rigidity of the lead wires and the terminals thereof is small, and an effect that connection between the terminals of the magnetic head and the terminals of the thin film lead wires is easy are obtainable conspicuously.

Further, the gimbal portion 1 has been formed at the point portion of the load beam 2 in the above description, but it is a matter of course that it may be arranged so that a gimbal and a load beam are formed separately and the gimbal is mounted to the point portion of the load beam as the magnetic head assembly cited in the description of a related art. At this time, however, since it is difficult to form the thin film lead wire extending from the gimbal over to the load beam as described above, it may also be arranged so that the thin film lead wires are formed at the gimbal portion only, thereby to connect one terminal of the thin film lead wire formed on this gimbal portion is connected to the magnetic head as described above, and to connect another terminal of the thin film lead wire formed on the gimbal portion to the lead wire connected to an external circuit. Here, since the lead wire connected to another terminal of the thin film lead wire is naturally irrelevant to the movement of the magnetic head in a pitch direction and a roll direction, the rigidity of the lead wires will never become a problem.

Lastly, an example of a magnetic recorder on board with such a magnetic head assembly will be described briefly.

Figure 17:
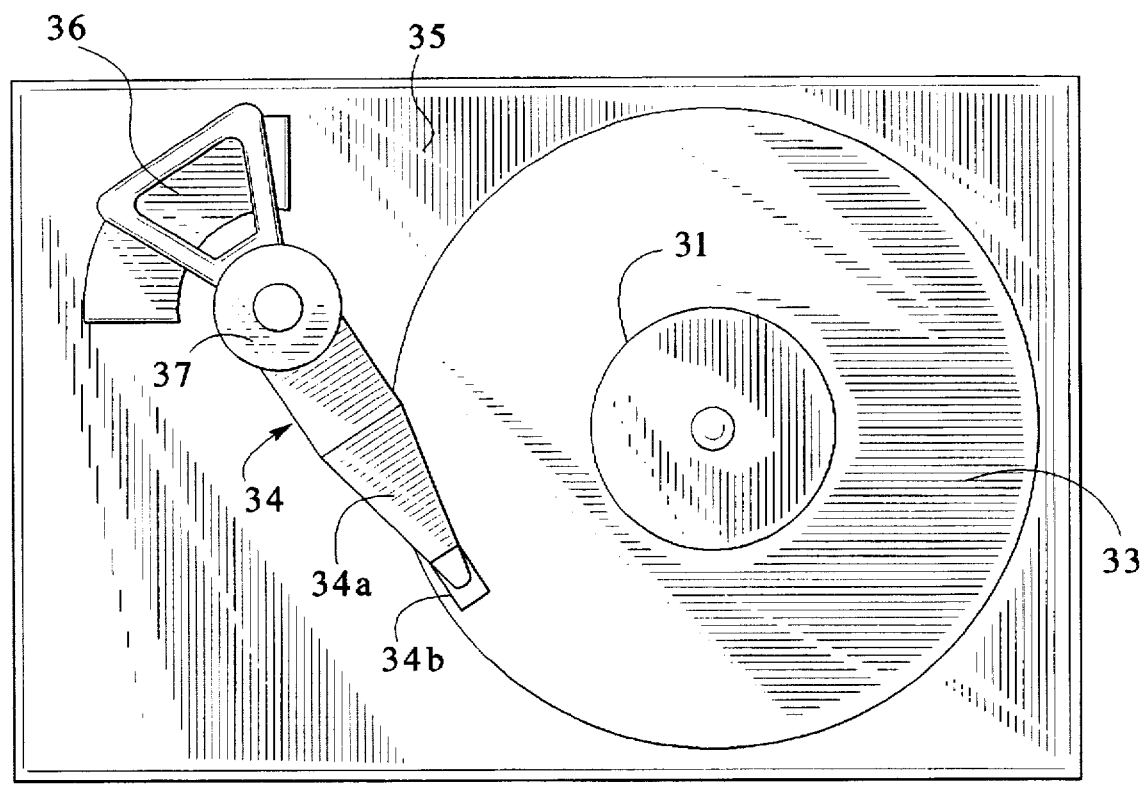
FIG. 17 is a plan view showing a structural example of a magnetic recorder.
Figure 18:
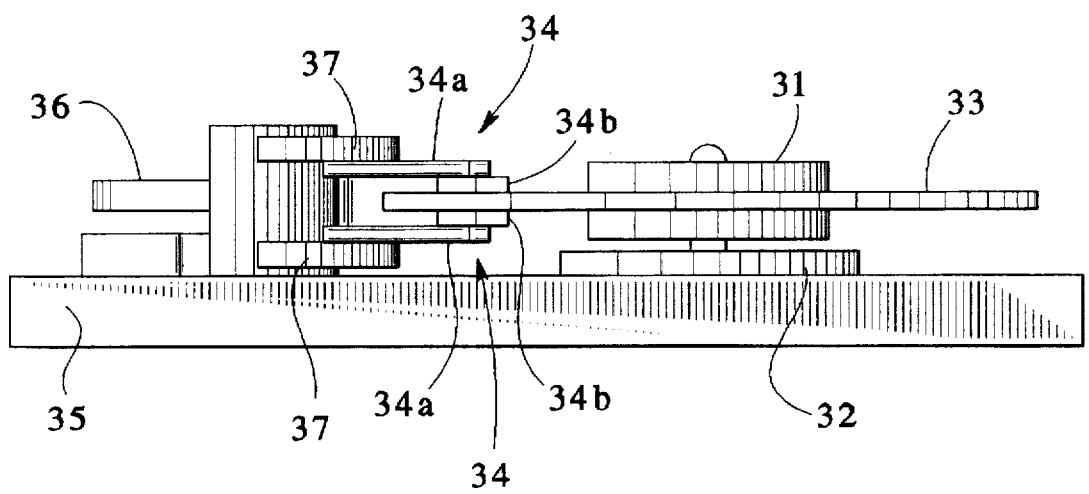
FIG. 18 is a front view showing a structural example of a magnetic recorder.
Figure 19:
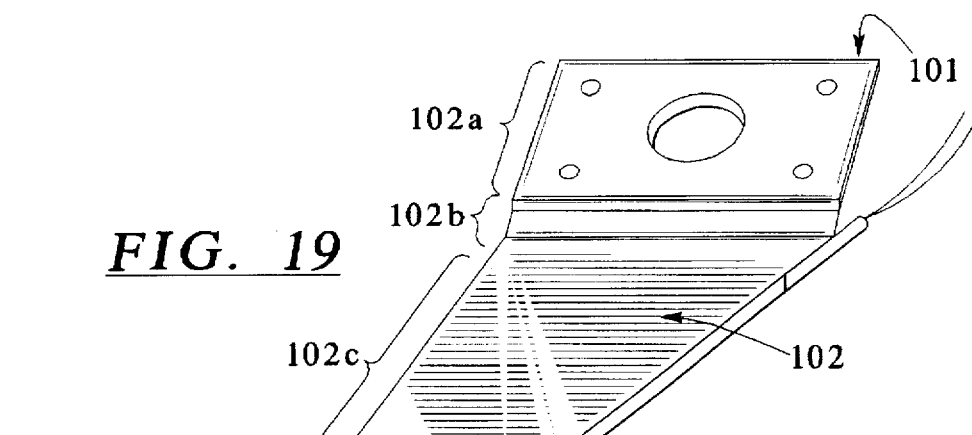
FIG. 19 is a perspective view showing a structural example of a conventional magnetic head assembly.
Figure 20:
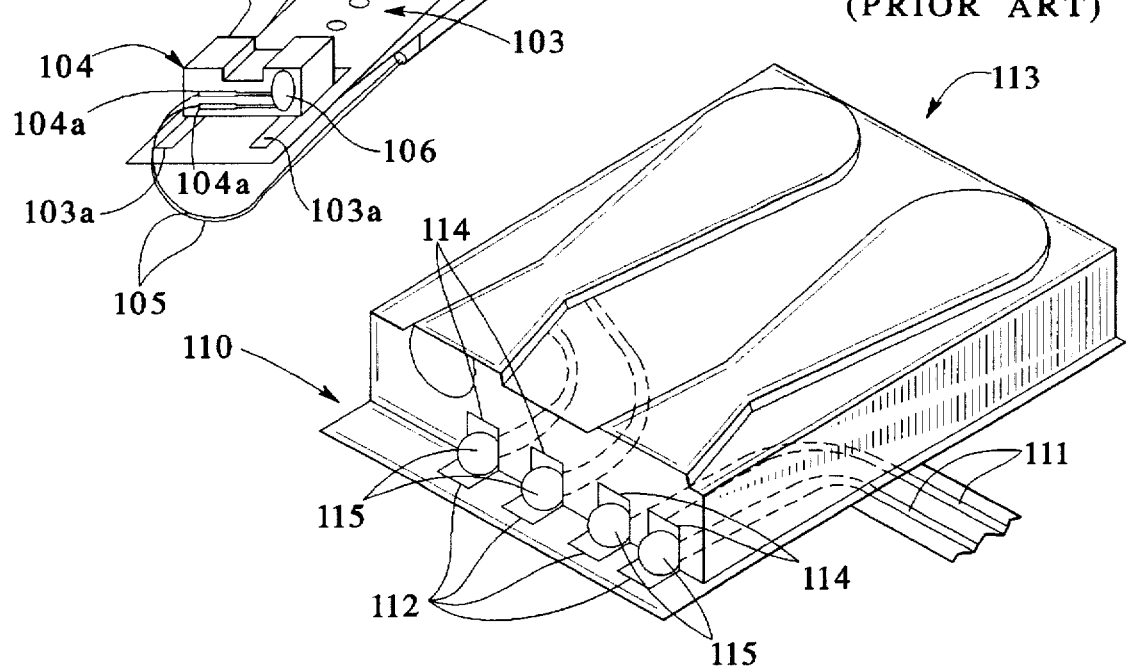
FIG. 20 is a perspective view showing a state of connection between terminals of the thin film lead wires and terminals of the magnetic head in a conventional magnetic head assembly.
Figure 21:
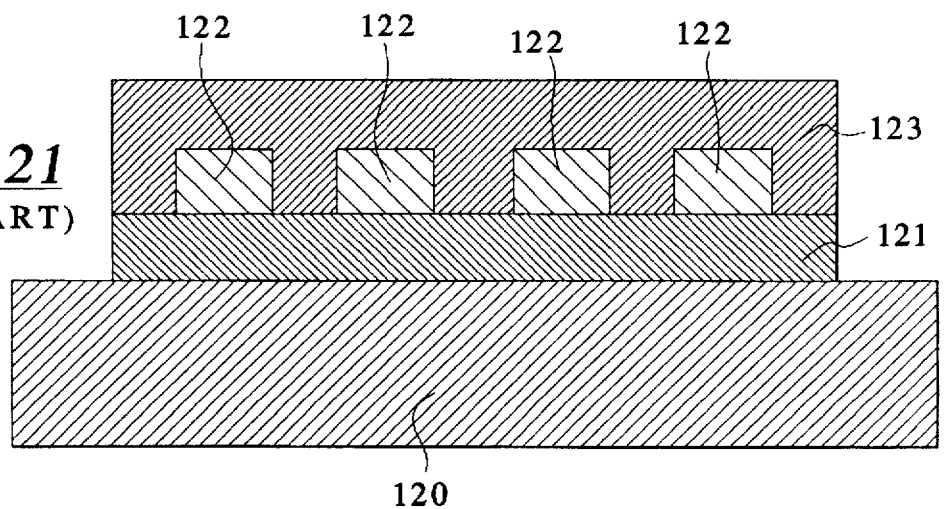
FIG. 21 is a sectional view showing a structure of a thin film lead wire in a conventional magnetic head assembly.

As shown in FIG. 17 and FIG. 18, in this magnetic recorder, a magnetic disk 33 fixed at a predetermined position by means of a damper 31 and rotated by a spindle motor 32 and a magnetic head assembly 34 in which a slider 34b on board with a magnetic head is mounted at the point portion of a load beam 34a are arranged on a common chassis 35, and recording and reproduction are performed on and from the magnetic disk 33 by means of this magnetic head assembly 34. Here, the magnetic head assembly 34 is disposed on both sides of the magnetic disk 33 putting it therebetween so that recording and reproduction can be made on and from both sides of the magnetic disk 33. Further, the read end portion of the magnetic head assembly 34 is mounted on an arm 37 which is moved by means of a voice coil motor 36 or the like, and the magnetic head assembly 34 is moved through this arm 37 so that the slider 34b on board with a magnetic head is positioned at a predetermined position on the magnetic disk 33 at time of recording and reproduction.

As described above, according to a magnetic head assembly according to the embodiment of the present invention, it is possible to connect the terminals 9a of the thin film lead wires 9 and the terminals 5a of the magnetic head to each other easily and accurately. Further, since the wall thickness of the gimbal 1 located under the terminals 9a of the thin film lead wires 9 is formed thin or a gimbal portion corresponding thereto is not provided, it is possible to lower the rigidity of the terminals 9a of the thin film lead wires 9 which are bent, and, even when the material thickness of the gimbal 1, the number of terminals 5a of the magnetic head and so on are varied, it is possible to set the slider 5 pressing force at a desired value. Furthermore, by forming the protective film 9d of the thin film lead wires 9 of a conductive material, it is possible to lower the rigidity of the thin film lead wires 9 and to reduce the influence by the thin film lead wires upon the movement of the slider in a pitch direction and a roll direction at time of recording and reproduction.

Further, according to the embodiment of the present invention, the terminals 9a of the thin film lead wires 9 and the terminals 5a of the magnetic head are connected to each other securely, the rigidity of the terminals 9a of the thin film lead wires 9 which are transformed by bending or the like, and transformation of the gimbal caused by excessive slider pressing force is evaded, thus making it possible to prevent deterioration of the floating posture of the slider 5.

What is claimed is:

1. A magnetic head assembly having a slider, comprising:

a load beam having a gimbal portion at a distal end and a fitting portion at a proximal end;

a slider having a magnetic head portion and fitted to said gimbal portion;

a thin film lead extending between said gimbal portion and said fitting portion on said load beam;

a slider terminal provided on an end face of said slider and connected to said magnetic head portion; and a gimbal terminal portion formed in said gimbal portion, said gimbal terminal portion comprises an elastically deformable free end portion separated from said gimbal portion, said elastically deformable free end portion being bent out of a plane of said gimbal portion to engage said slider terminal, said section having a thickness which is thinner than that of said gimbal portion from which said end portion is separated, said elastically deformable end portion comprising an electrical terminal which is placed into electrical contact with said slider terminal when said slider is positioned on said gimbal portion.

2. A magnetic head assembly according to claim 1, wherein said elastically deformable end portion is bent.

3. A magnetic head assembly according to claim 2, wherein said gimbal terminal portion has notch portions on opposite ends of said bent portion.

4. A magnetic head assembly according to claim 1, wherein said elastically deformable free end portion of said gimbal terminal portion has a chamfer portion.

5. A magnetic head assembly according to claim 1, wherein said thin film lead has a conductive pattern, a dielectric layer made to lie between this conductive pattern and said load beam and a protective film covering the surface of said conductive pattern.

6. A magnetic head assembly having a slider, comprising:

a load beam having a gimbal portion at a distal end and a fitting portion at a proximal end;

a slider having a magnetic head portion and fitted to said gimbal portion;

a thin film lead extending between said gimbal portion and said fitting portion on said load beam having a conducive pattern, a dielectric layer made to lie between this conductive pattern and said load beam and a protective film covering the surface of said conductive pattern;

a slider terminal provided on an end face of said slider and connected to said magnetic head portion; and a gimbal terminal portion formed in said gimbal portion, said gimbal terminal portion comprises an elastically deformable free end portion separated from said gimbal portion, said elastically deformable free end portion being bent out of a plane of said gimbal portion to engage said slider terminal, said section having a thickness which is thinner than that of said gimbal portion from which said end portion is separated, said elastically deformable end portion comprising an electrical terminal which is placed into electrical contact with said slider terminal when said slider is positioned on said gimbal portion;

wherein, when said slider is fitted onto said gimbal portion, said gimbal terminal portion and said slider terminal are engaged electrically with each other by means of elastic deformation force of said electrically deformable free end portion.

7. A magnetic disk device comprising:

a chassis;

a magnetic disk;

a disk driving means for driving said magnetic disk; and a slider having a magnetic head assembly for performing recording and reproduction on said magnetic disk, including:

a load beam having a gimbal portion at a distal end and a fitting portion at a proximal end;

a thin film lead extending between said gimbal portion and said fitting portion on said load beam;

a slider terminal provided on an end face of said slider and connected to said magnetic head assembly; and a gimbal terminal portion formed in said gimbal portion, said gimbal terminal portion comprises an elastically deformable end portion separated from said gimbal portion, said elastically deformable free end portion being bent out of a plane of said gimbal portion to engage said slider terminal said electrically deformable free end portion having a thickness which is thinner than that of said gimbal portion from which said elastically deformable free end portion is separated, said elastically deformable end portion comprising an electrical terminal which is placed into electrical contact with said slider terminal when said slider is positioned on said gimbal portion;

a head driving means for aligning said magnetic head assembly at a predetermined position on said magnetic disk; and a cover fitted to said chassis so as to cover said magnetic disk, said head assembly and said head driving means.

* * * * *